US010642641B2

United States Patent
Li et al.

(10) Patent No.: US 10,642,641 B2
(45) Date of Patent: May 5, 2020

(54) METHOD, APPARATUS, AND SYSTEM FOR CREATING VIRTUAL MACHINE, CONTROL DEVICE, AND STORAGE MEDIUM

(71) Applicant: Tencent Technology (Shenzhen) Company Limited, Shenzhen (CN)

(72) Inventors: Dekai Li, Shenzhen (CN); Yudong Chen, Shenzhen (CN); Weiyue Zhou, Shenzhen (CN); Min Wang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 128 days.

(21) Appl. No.: 15/962,678

(22) Filed: Apr. 25, 2018

(65) Prior Publication Data
US 2018/0239633 A1    Aug. 23, 2018

Related U.S. Application Data

(63) Continuation of application No. PCT/CN2017/092197, filed on Jul. 7, 2017.

(30) Foreign Application Priority Data

Jul. 7, 2016  (CN) .......................... 2016 1 0539385

(51) Int. Cl.
*G06F 9/46*   (2006.01)
*G06F 9/455*  (2018.01)
(Continued)

(52) U.S. Cl.
CPC ........ *G06F 9/45558* (2013.01); *G06F 9/4401* (2013.01); *G06F 9/50* (2013.01);
(Continued)

(58) Field of Classification Search
CPC ...... G06F 9/45558; G06F 9/4401; G06F 9/50; G06F 9/5077
See application file for complete search history.

(56) References Cited

U.S. PATENT DOCUMENTS

| | | | | |
|---|---|---|---|---|
| 8,923,320 B2 * | 12/2014 | Dasari | ..................... | H04L 47/82 370/419 |
| 2017/0116015 A1 * | 4/2017 | Cropper | .............. | G06F 9/45558 |
| 2017/0300228 A1 * | 10/2017 | Gollapudi | ............... | G06F 3/061 |

FOREIGN PATENT DOCUMENTS

| | | |
|---|---|---|
| CN | 102929701 | 2/2013 |
| CN | 102946413 | 2/2013 |

(Continued)

OTHER PUBLICATIONS

Office Action dated Oct. 8, 2018 for Chinese Application No. 201610539385.8, (10 pages).

(Continued)

*Primary Examiner* — Camquy Truong
(74) *Attorney, Agent, or Firm* — Brinks Gilson & Lione

(57) ABSTRACT

Systems, apparatus, and methods for creating a virtual machine are provided. A control device may receive a virtual machine creation request. The control device may select a plurality of candidate host machines from a plurality of host machines based on the virtual machine creation request and attribute information corresponding to the candidate host machines. The control device may determine a target host machine from the candidate host machines based on a priority of each candidate host machine. The control device may create a virtual machine on the target host machine.

20 Claims, 5 Drawing Sheets

(51) Int. Cl.
 G06F 9/50 (2006.01)
 G06F 9/4401 (2018.01)
(52) U.S. Cl.
 CPC .. G06F 9/5077 (2013.01); *G06F 2009/45562* (2013.01); *G06F 2009/45595* (2013.01)

(56) References Cited

FOREIGN PATENT DOCUMENTS

| CN | 103164283 A | 6/2013 |
|---|---|---|
| CN | 103176847 | 6/2013 |
| CN | 103885831 A | 6/2014 |
| CN | 104008002 | 8/2014 |
| CN | 104793982 A | 7/2015 |
| CN | 106020937 | 10/2016 |

OTHER PUBLICATIONS

International Search Report with English translation, issued in International Application No. PCT/CN2017/092197, dated Sep. 27, 2017, pp. 1-4, State Intellectual Property Office of the P.R. China, Beijing, China.

* cited by examiner

METHOD, APPARATUS, AND SYSTEM FOR CREATING VIRTUAL MACHINE, CONTROL DEVICE, AND STORAGE MEDIUM

CROSS REFERENCE TO RELATED APPLICATIONS

This application is a continuation of International Application PCT/CN2017/092197, filed Jul. 7, 2017, entitled METHOD, APPARATUS AND SYSTEM FOR CREATING VIRTUAL MACHINE, CONTROL DEVICE, AND STORAGE MEDIUM, which claims priority to Chinese Patent Application No. 201610539385.8, filed Jul. 7, 2016, both of which are incorporated herein by reference in their entirety.

TECHNICAL FIELD

This application relates to the field of cloud technologies, and in particular, to a method, an apparatus, and a system for creating a virtual machine.

BACKGROUND

A cloud computing system generally includes a control device and a large quantity of host machines. A host machine may be selected for the virtual machine. Failure to account for resources used by the virtual machine, resources available by the host machine, resources available by other host machines, and other aspects of a cloud computing environment may result in unsuccessful or inefficient deployment of a virtual machine.

SUMMARY

Aspects of this disclosure may relate to systems, apparatus, and methods for creating a virtual machine. In an example aspect, a control device may receive a virtual machine creation request. The control device may select a plurality of candidate host machines from a plurality of host machines based on the virtual machine creation request and attribute information corresponding to the candidate host machines. The control device may determine a target host machine from the candidate host machines based on a priority of each candidate host machine. The control device may create a. Additional or alternative aspects, features, and improvements are described in the description and drawings disclosed herein.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

A cloud computing system may include a large quantity of host machines. Because the cloud computing system has a large quantity of host machines, a host machine may be selected for deployment of a virtual machine. The virtual machine may have hardware criteria, such as a quantity of needed central processing units (CPUs) or a size of a needed memory. Deploying the virtual machine to a host machine without considering resource criteria of the virtual machine, the hardware resource situation of available host machines, and/or the hardware resource criteria of other virtual machines deployed on the available host machines may result in failures and inefficiencies related to virtual machine creation and management. The failures and inefficiencies may include, for example, failures in creating virtual machines, inefficiencies in managing virtual machines, and/or degradation in performance of virtual machines.

Embodiments of this application provide a method for creating a virtual machine, to select a host machine for a to-be-created virtual machine from multiple aspects, thereby improving the success rate of creating the virtual machine. The embodiments of this application further provide a corresponding apparatus and system.

A technical advancement of the system, apparatus, and methods described below may include improvements to the success rate and efficiencies in managing and creating virtual machines. When selecting a host machine for a virtual machine, considering the hardware resources that can be provided for the to-be-created virtual machine by the host machine and hardware criteria information of the to-be-created virtual machine may improve the success rate of creating the virtual machine. A host machine may be selected for deployment of the virtual machine after the resource criteria of the virtual machine, the hardware resource situation of available host machines, the hardware resource criteria of other virtual machines, and/or other aspects of a cloud-computing environment are evaluated.

Additional or alternative benefits, efficiencies, and improvements over existing market solutions are made evident in the system, apparatus, and methods described below. While various embodiments are described below, it will be apparent to those of ordinary skill in the art that many more embodiments and implementations are possible. Accordingly, the embodiments described herein are examples, not the only possible embodiments and implementations.

Figure 1:
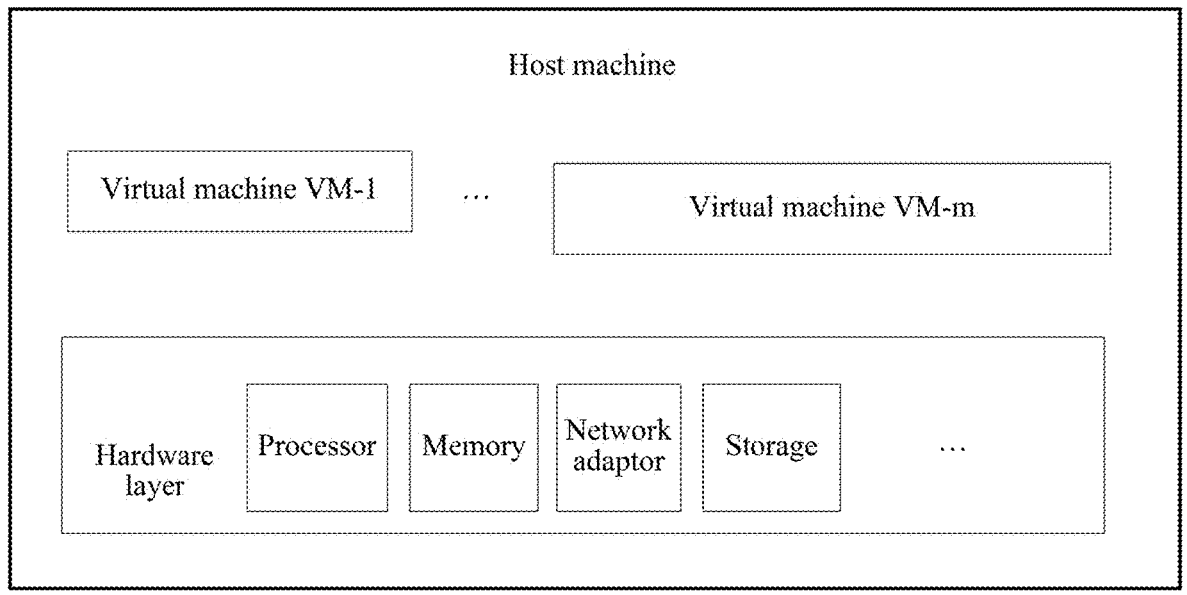
FIG. 1 illustrates a schematic structural diagram of a host machine according to an embodiment of this application.

FIG. 1 illustrates a schematic structural diagram of a host machine according to an embodiment of this application. The host machine shown in FIG. 1 includes a virtual machine (VM) and a hardware layer. The hardware layer may provide a hardware resource for each virtual machine.

The virtual machine may simulate one or more virtual machines on one host machine by using a virtual machine simulator. The virtual machines work like real computers. An operating system and an application program may be installed in the virtual machine, and the virtual machine may also access network resources. For the application program that runs in the virtual machine, the virtual machine works like a real computer. FIG. 1 shows m virtual machines VM-1 to VM-m, where m may be any integer greater than 1.

The hardware layer is used to support a hardware platform of a virtualized environment. The hardware layer may include multiple types of hardware, for example, a processor (such as CPU) and a memory, a high-speed or low-speed input/output (I/O) device such as a network adapter or a storage, and another device having a specific processing function, such as an input/output memory management unit (IOMMU). The IOMMU may be used in conversion between a virtual machine physical address and a host physical address. An example of the storage is a magnetic disk (such as hard disk).

With the continuous development of cloud computing, both the host machine and the virtual machine have an obvious heterogeneous trend. A heterogeneous network environment refers to a network environment formed by computers and systems produced by different manufacturers. Because a cloud computing system usually has features such as a long maintenance period and a large cluster scale, large quantities of host machines need to be purchased batch by batch, causing many differences of the host machines in software and hardware aspects, for example: whether to support a private network (Virtual Private Cloud), whether to support a cloud disk, whether to support a solid state drive (SSD), having different central processing unit (CPU) types, and having different virtualization manners (such as KVM or Xen) and management programs (such as Hypervisor). Meanwhile, various types of application programs run in the virtual machine, and because of the different functions and features of the application programs, the virtual machine also has different requirements for the network, the storage, the CPU, and the virtualization manner of the host machine. This causes a problem that not all host machines can support the to-be-created virtual machine. If hardware resource requirements of the to-be-created virtual machine are considered only, the success rate of creating the virtual machine is quite low. Therefore, the method for creating a virtual machine provided in the embodiments of this application not only considers the hardware resource requirements of the to-be-created virtual machine, but also considers requirements of the to-be-created virtual machine in other aspects, thereby improving the success rate of creating the virtual machine.

Figure 2:
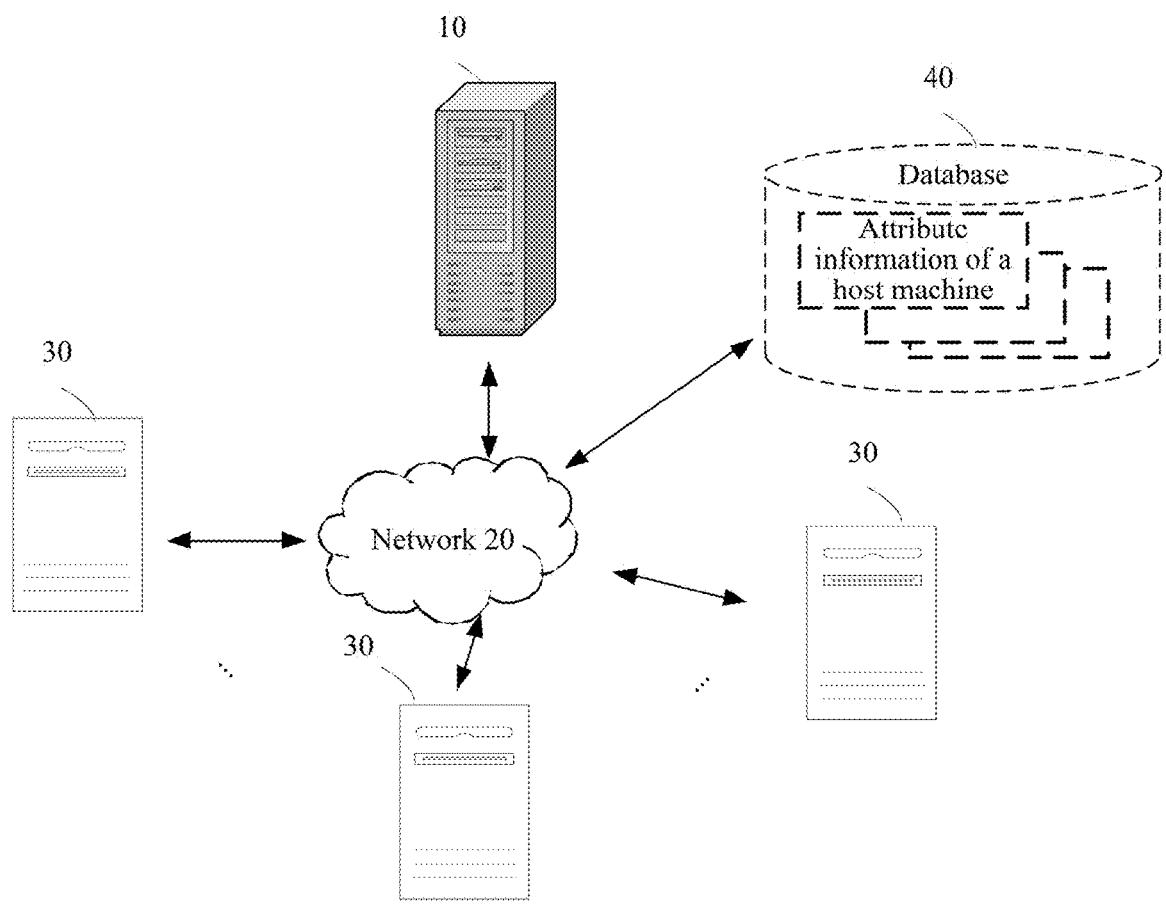
FIG. 2 illustrates a schematic structural diagram of a cloud computing system according to an embodiment of this application.

FIG. 2 illustrates a schematic structural diagram of a cloud computing system according to an embodiment of this application. As shown in FIG. 2, the cloud computing system includes a control device 10, a network 20, and multiple host machines 30. The control device 10 is communicatively connected to the multiple host machines 30 by using the network 20. The control device 10 may store attribute information of each host machine, or the cloud computing system further includes a database 40 and the database 40 stores attribute information of each host machine.

When a host machine is installed to the cloud computing system, a host machine introducing process is needed to perform necessary initialization. The host machine reports attribute information of the host machine to the control device 10, and the control device 10 may store the attribute information of the host machine itself or into the database 40.

The attribute information of the host machine includes but is not limited to the content shown in Table 1.

TABLE 1

Main attribute table of the host machine

| Field | Description |
| --- | --- |
| uuid | Host machine identification number |
| deviceId | Device number |
| ip | IP address |
| type | Machine type |
| osName | Operating system name |
| kernelVersion | Kernel version |
| cpuModel | CPU model |
| Hypervisor | Virtualization manner (management program) |
| zoneId | Logical zone number |
| idcId | Internet data center number |
| rackId | Rack number |
| innerSwitch | Switch |
| flag | Host machine state |
| cbsFlag | Whether to support a cloud disk |
| ssdFlag | Whether to support an ssd |
| netVersion | Network version |
| soldPool | Sold pool |
| cpuType | CPU type, such as NUMA01 |
| cpuAvailable | Available CPU resource |
| nodeQuota | CPU node resource quota |
| memAvailable | Available memory resource |
| diskAvailable | Available magnetic disk resource |

The foregoing Table 1 shows only some main attribute information of the host machine, and other information that is not listed but belongs to the host machine may be regarded as the attribute information of the host machine.

Figure 3:
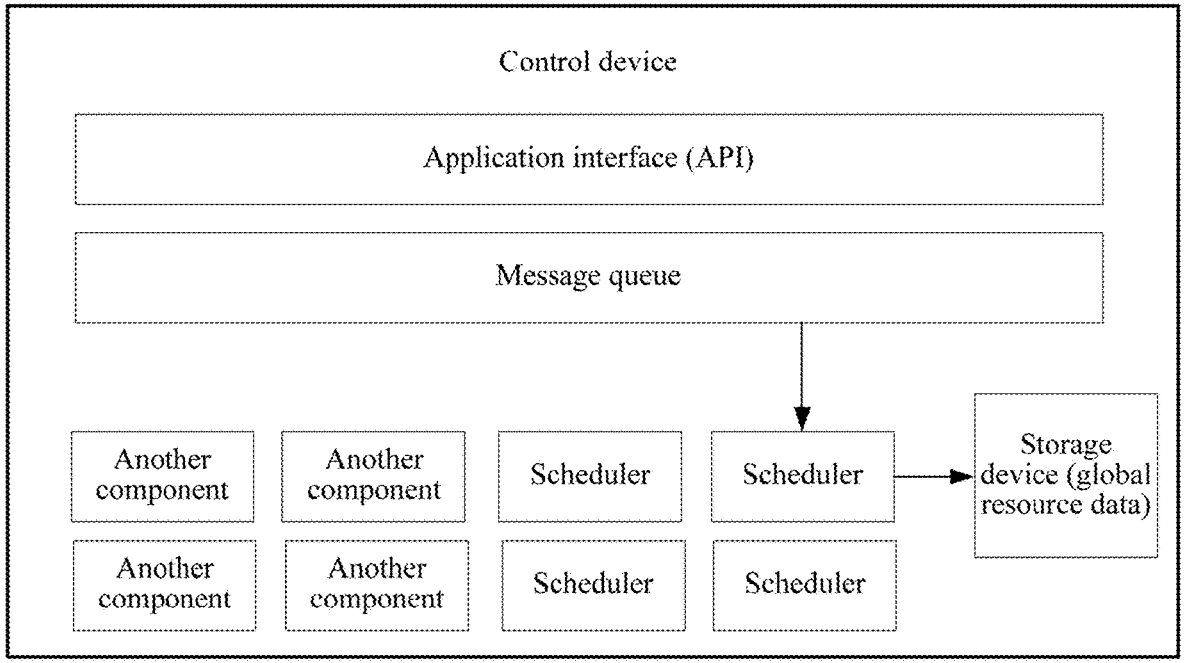
FIG. 3 illustrates a schematic structural diagram of a control device according to an embodiment of this application.

FIG. 3 illustrates a schematic diagram of a control device according to an embodiment of this application. As shown in FIG. 3, the control device includes an application interface (API), a message queue, a scheduler, and another component. There may be multiple schedulers and other components. The control device shown in FIG. 3 further includes a storage device. The storage device is configured to store global resource data. The global resource data may include the attribute information of the host machine shown in Table 1 and remaining amounts of resources on the host machine.

The API is an access module of the control device, and another device (for example, a front-end device) interacts with the control device by using an API component. The API component is responsible for performing parameter checking on a request packet of a virtual machine creation request, routing the request, and delivering the request packet to another component in the system. For an asynchronous task, the API component delivers the request packet to a message queue component.

Message queue: for the asynchronous task, a message flows in the message queue, and each component of the control device has an identification of a producer or a consumer. The producer sends a message to the message queue, and the consumer receives the message from the message queue.

Scheduler: The scheduler is responsible for selecting a suitable host machine for a virtual machine. Seen from a specific process, the scheduler mainly completes the following several tasks:

The scheduler is used as a consumer to receive, from the message queue, a message for reading the virtual machine;

select a suitable host machine for the virtual machine according to a requirement of the virtual machine and attribute information of the host machine;

attempt to modify global resource data after selecting the host machine, and if the modification fails, select other candidate host machines to re-modify the resource data, until the modification is successful or all modifications fail;

send information about the selected host machine to the message queue; or gather information about the selected host machine to an existing message, and send the message to the message queue, where the message flows to subsequent steps.

Because the scheduler component has multiple instances, that is, multiple schedulers concurrently perform scheduling, host machines may be selected for different virtual machines, so that the throughput and the concurrent capability of the cloud computing system can be improved, to prevent the scheduler from becoming a performance bottleneck of the entire system.

Another component: separately responsible for functions such as network management of the virtual machine, cloud disk storage management, image cache management, and virtual machine production.

Creating the virtual machine on the host machine is controlled by the control device. The following describes logic for creating a virtual machine in the embodiments of this application with reference to FIG. 4.

Figure 4:
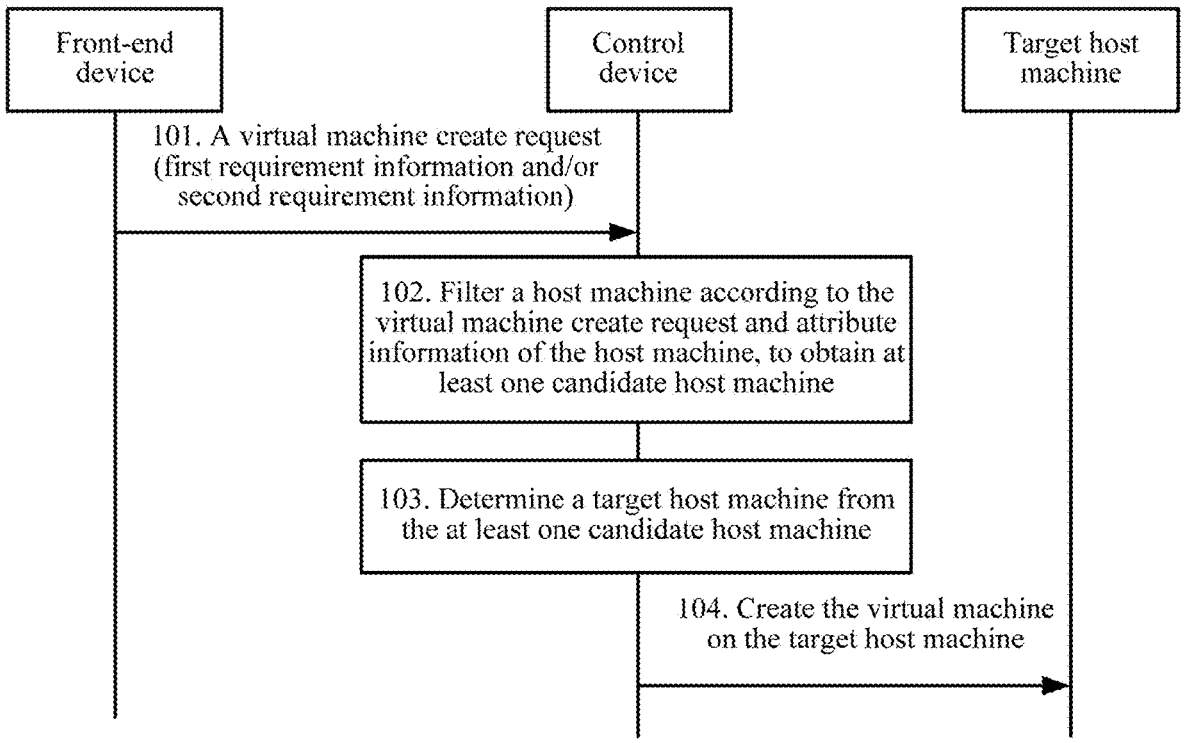
FIG. 4 illustrates a schematic diagram of a method for creating a virtual machine according to an embodiment of this application.

As shown in FIG. 4, the logic for creating a virtual machine in the embodiments of this application may include various operations or steps:

In step 101, a control device receives a virtual machine creation request. In the step, the control device receives a virtual machine creation request sent by a front-end device, and the front-end device may be a terminal device used by a worker responsible for creating the virtual machine. Correspondingly, the control device may be referred to as a back-end device.

The virtual machine creation request includes first requirement information and/or second requirement information of the to-be-created virtual machine.

The first requirement information is resource requirement information. The first requirement information may include processor information, memory information, and magnetic disk information required by the to-be-created virtual machine. The first requirement information mainly refers to hardware resource information that can be provided by the host machine.

The second requirement information includes at least one piece of requirement information, for creating the virtual machine, of a solid state drive, a cloud disk, a private network, a network adapter, a router, a network structure, a data center, a rack, a type of a host machine, a resource pool to which a host machine belongs, and a virtualization type.

In step 102, the control device filters the multiple host machines according to the virtual machine creation request (for example, the first requirement information and/or the second requirement information), and the attribute information of each host machine, to select at least one candidate host machine from the multiple host machines.

For the attribute information of the host machine, reference may be made to the description of the part in Table 1 for understanding. A string filter model may be constructed according to the attribute information of the host machine. The string filter model includes multiple filters connected in series, each filter is responsible for a filtering function, and each filter performs corresponding determining according to the first requirement information and the second requirement information, and then performs corresponding filtering. For example: a first filter connected in series is responsible for filtering out host machines whose CPU resources, memory resources, and magnetic disk resources required by the virtual machine do not meet the requirement of the to-be-created virtual machine, and only remaining host machines whose CPU resources, memory resources, and magnetic disk resources meet the resource requirements; and a second filter connected in series is responsible for filtering out host machines that support or do not support an SSD. Functions of filters in a specific filtering model may be set according to the first requirement information and the second requirement information. If in the second requirement information, the host machines are required to support the SSD, the filter filters out, according to the second requirement information, host machines that do not support the SSD, and remains the host machines that support the SSD. For functions of other filters, reference may be made to the filter for understanding, except that other filters are responsible for other filtering functions.

Figure 5:
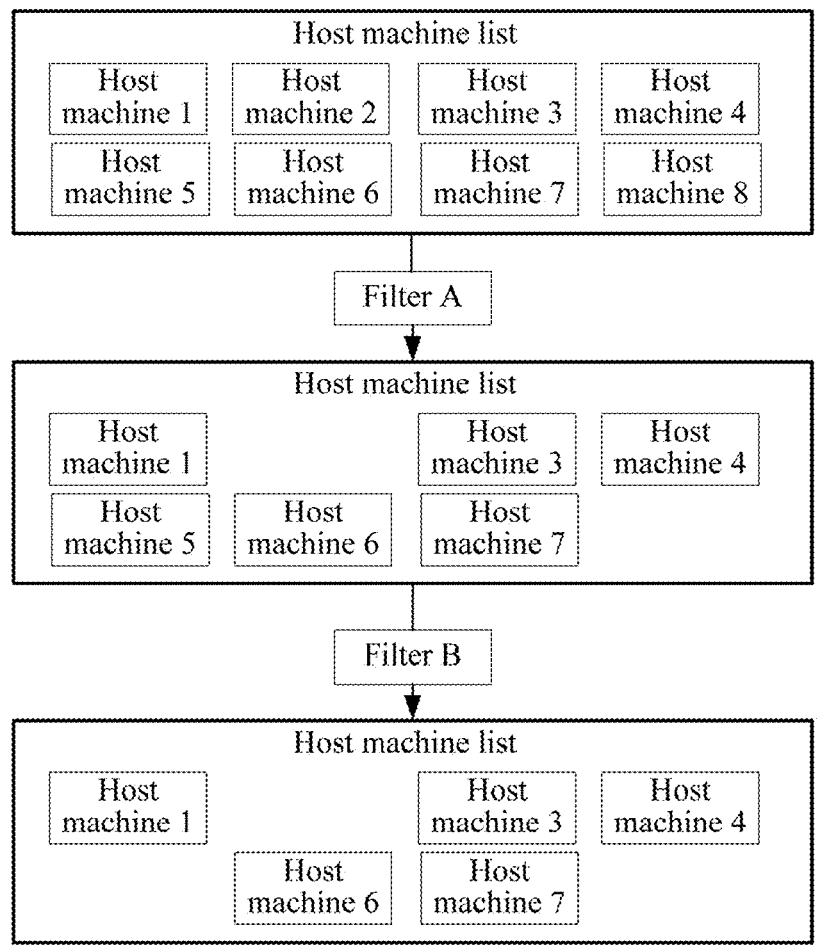
FIG. 5 illustrates a schematic diagram of an example of a filtering process according to an embodiment of this application.
Figure 5:
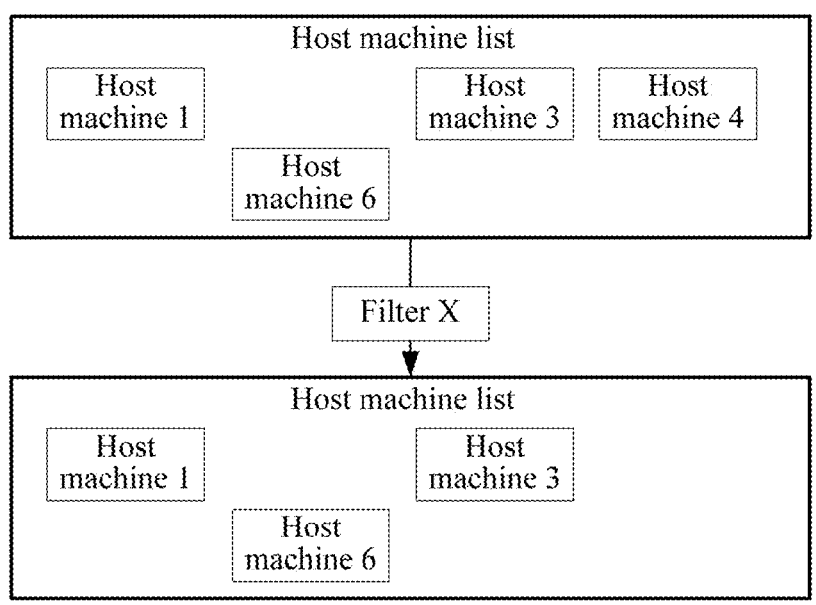

The following describes the process of filtering host machines to obtain at least one candidate host machine in the embodiments of this application by using FIG. 5 as an example.

As shown in FIG. 5, if the cloud computing system has eight host machines, and certainly, the cloud computing system may have more or less host machines, the eight host machines are only an example for ease of description, but should not be understood as a limitation to the quantity of the host machines. However, no matter how many host machines the cloud computing system has, the filtering processes are similar, and may all be understood according to the example.

The first requirement information is hardware resource requirement information that can be provided by the host machine, such as CPU resources, memory resources, and magnetic disk resources required by the virtual machine.

The second requirement information includes: needing to support an SSD, needing to support a cloud disk, needing to support a private network, specifying a type of a network adapter, specifying a router, and the like.

As shown in FIG. 5, the eight host machines are filtered according to the attribute information of the host machine and the first requirement information and the second requirement information of the to-be-created virtual machine. A filter A is responsible for filtering out host machines that do not meet the hardware resource requirements that can be provided by the host machines, such as the CPU resources, the memory resources, and the magnetic disk resources required by the virtual machine, and remaining host machines that meet the resource requirements. After passing through the filter A, two host machines are filtered out. The remaining six host machines then enter a filter B. The filter B is responsible for filtering out, according to the second requirement information, a host machine that does not support the SSD. After being filtered by the filter B, another host machine is filtered out, and five host machines remain. Then, the five host machines sequentially pass through other filters. The other filters may be separately responsible for filtering out a host machine that does not support the cloud disk, responsible for filtering out a host machine that does not support a private network, or the like. Finally, the remaining host machines reach a filter X, and the filter X is responsible for filtering out a host machine that does not meet the virtualization type. For example: if the virtualization type of the host machine needs to be KVM, a host machine whose virtualization type is Xen is filtered out. After the filtering ends, three candidate host machines are obtained.

In the example of the foregoing FIG. 5, the filtering process is performing filtering according to the attribute information of the host machine. If the to-be-created virtual machine does not clearly give whether needing to support an SSD, the filter B does not perform any filtering, but directly releases all host machines.

Not every filter is shown in the foregoing FIG. 5 specifically, but the filtering logic include one or more of the following examples In a first example, the filter logic may determine whether the host machines are host machines having hardware resource requirements that can be provided by the host machine, such as CPU resources, memory resources, and magnetic disk resources required by the virtual machine, and remain host machines that meet the resource requirements.

In a second example, the filter logic may determine whether the virtual machine needs to support an SSD; and if the virtual machine needs to support the SSD, only remain host machines that support the SSD; otherwise, only remain host machines that do not support the SSD.

In a third example, the filter logic may determine whether the virtual machine needs to be connected to a cloud disk, and if the virtual machine needs to be connected to the cloud disk, only remains host machine that support the cloud disk; otherwise, perform no operation.

In a fourth example, the filter logic may determine whether the virtual machine needs a private network, and if the virtual machine needs the private network, only remain host machines that support the private network; if the virtual machine does not need the private network, only remain host machines that do not support the private network.

In a fifth example, the filter logic may determine whether the virtual machine specifies a network adapter, and if the virtual machine specifies the network adapter, only remain host machines having a specified network adapter type; otherwise, perform no operation.

In a sixth example, the filter logic may determine whether the virtual machine specifies a router, and if the virtual machine specifies the router, only remain host machines in the specified router; otherwise, perform no operation.

In a seventh example, the filter logic may determine whether the virtual machine needs a bonding network structure, and if the virtual machine needs the bonding network structure, only remain host machines that support the bonding network structure; otherwise, perform no operation.

In an eighth example, the filter logic may determine whether the virtual machine specifies a data center/machine room, and if the virtual machine specifies the data center/machine room, only remain host machines in the specified data center/machine room; otherwise, perform no operation.

In a ninth example, the filter logic may determine whether the virtual machine specifies a rack, and if the virtual machine specifies the rack, only remain host machines on the specified rack; otherwise, perform no operation.

In a tenth example the filter may logic determine whether the virtual machine is a large memory type, and if the virtual machine is the large memory type, only remain host machines of a large memory type (M10); otherwise, only remain host machines of a non-large memory type.

In an eleventh example, the filter logic may determine whether the virtual machine specifies a type of a host machine, and if the virtual machine specifies the type of the host machine, only remain host machines having a specified type; otherwise, perform no operation.

In a twelfth example, the filter logic may determine whether the virtual machine specifies a sold pool, and if the virtual machine specifies the sold pool, only remain host machines in the specified sold pool; otherwise, only remain host machines in a default sold pool.

In a thirteenth example, the filter logic may determine whether the virtual machine specifies a virtualization type, and if the virtual machine specifies the virtualization type, only remain host machines of the specified virtualization type; otherwise, perform no operation; through the foregoing steps, an obtained host machine list is a candidate host machine list.

Referring back to FIG. 4, in step 103, the control device determines a target host machine from the at least one candidate host machine.

Optionally, the control device determines the target host machine from the at least one candidate host machine according to a priority of each candidate host machine (the control device may determine the priority of each candidate host machine from multiple dimensions).

In step 104, the control device may cause the virtual machine to be created on the target host machine.

According to this embodiment of this application, the control device may randomly select the target host machine. Certainly, to select a most suitable target host machine, after the multiple host machine are filtered, to obtain at least one candidate host machine, priorities of dimensions of each candidate host machine may be determined.

The priorities of the dimensions may include: a private network priority (vpcPrio), a concurrent task priority (taskPrio), a historical error priority (errorPrio), an anti-affinity priority (affinityPrio), an idleness priority (freePrio), an image cache priority (imgPrio), a fragmentation priority (fragmentPrio), and the like.

The priorities of the dimensions may be separately calculated, for example, priorities of the dimensions may be calculated by using the following solutions.

The private network priority: vpcPrio, a smaller value indicates a higher priority. The candidate host machine list may be traversed to determine a private network priority for each host machine. The vpcPrio of a host machine that supports the private network may be assigned the value 0, and the vpcPrio of a remaining host machines is assigned the value 1.

An IP address of the private network does not depend on a physical network topology, and is easier for future migration. The effect of the private network priority is preferentially placing the virtual machine on the host machine that supports the private network, so that future migration is more convenient and flexible.

The concurrent task priority: taskPrio, a smaller value indicates a higher priority. The candidate host machine list may be traversed to determine a concurrent task priority for each host machine. The quantity of current tasks on the host machine is determined, and if the quantity is less than a concurrent threshold, the taskPrio is assigned the value 0; otherwise, the taskPrio is assigned the value of the quantity of current tasks. For example: the concurrent threshold is 3 by default, and certainly, the threshold may be configured.

The concurrent tasks on the host machine may be performed simultaneously, and the concurrency is excessively high. Therefore, the creation of the virtual machine may be slow or even fail. The effect of the concurrent task priority is preferentially placing the virtual machine on a host machine with a smaller quantity of concurrent tasks, to ensure the success rate and the timeliness of creating the virtual machine.

The historical error priority: errorPrio, a smaller value indicates a higher priority. The candidate host machine list may be traversed to calculate a historical error priority for each host machine. The quantity of historical errors of the host machine in a last period of time (for example, 24 hours by default) is determined. If the quantity is less than an error threshold, the errorPrio is assigned the value 0; otherwise, the errorPrio is assigned the value of the quantity of the historical errors. For example: the error threshold may be 5 by default, and the error threshold may be configured.

A host machine in which multiple errors occur in a short period of time may suffer some type of failure, and before the host machine is processed, if the virtual machine continues to be placed on the host machine, the task of creating the virtual machine may fail, and the success rate is reduced. The effect of the historical error priority is preferentially placing the virtual machine on a host machine in which no excessive errors occur, thereby improving the success rate of creating the virtual machine.

The anti-affinity priority: affinityPrio, a smaller value indicates a higher priority. The candidate host machine list may be traversed to calculate an anti-affinity priority for each host machine. The quantity of existing virtual machines on the host machine by a virtual machine user is determined, and if the quantity is less than an affinity threshold, the affinityPrio is assigned the value 0; otherwise, the affinityPrio is assigned the value of the quantity of the existing virtual machines. For example: the affinity threshold is 3, and certainly, the affinity threshold may be configured.

In a large-scale distribution system, it is nearly impossible to completely avoid errors. If virtual machines of a user are concentrated on one or several host machines, when these host machines fail, all the virtual machines are affected, which severely affects the availability of the entire user application. The effect of the anti-affinity priority is making virtual machines of a same user be widely distributed on different host machines, to perform distributed disaster recovery. Even though a single host machine fails, the impact on the availability of the entire application is relatively limited, so that the stability and the availability of the user application are improved.

The idleness priority: freePrio, a smaller value indicates a higher priority. The candidate host machine list may be traversed to determine whether each host machine is completely idle. If each host machine is completely idle, the freePrio is assigned the value 0; otherwise, the freePrio is assigned the value 1.

The effect of the idleness priority is protecting an idle host machine, and preferentially placing the virtual machine on a non-idle host machine, to fully use resources on the non-idle host machine, thereby improving the resource utilization.

The image cache priority: imgPrio, a smaller value indicates a higher priority. The candidate host machine list may be traversed to determine whether each host machine has an image file required by the virtual machine. If each host machine has the image file, the imgPrio is assigned the value 0; otherwise, the imgPrio is assigned the value 1.

The effect of the image cache priority is preferentially placing the virtual machine on a host machine that has stored a virtual machine image, so that a step of image downloading may be omitted when the virtual machine is actually produced, to reduce a production time, and improve the timeliness of the virtual machine production process.

The fragmentation priority: fragmentPrio, a smaller value indicates a higher priority. The candidate host machine list may be traversed to calculate a fragmentation priority for each host machine. The priority is calculated according to resources of two dimensions: a CPU and a memory. In a default case, the fragmentation priority is equal to a CPU fragmentation multiplied by a memory fragmentation. The formula is as follows:

$$FragmentPrio=(cpuUsed/cpuTotal)*(memUsed/memTotal)$$

cpuUsed represents the quantity of used CPU resources (including a to-be-placed virtual machine), cpuTotal represents the total quantity of CPU resources, memUsed represents the quantity of used memory resources (including a to-be-placed virtual machine), and memTotal represents the total quantity of memory resources.

Apart from the default cases, there are two cases that need to be specially processed. If the cpuUsed is equal to the cpuTotal, and the mem Used is equal to the memTotal, it means that after the virtual machine is placed on the host machine, both the CPU resources and the memory resources of the host machine are used completely. The resources of the host machine are fully used, this case is the most satisfactory case, and the fragmentPrio is assigned the value of the highest priority 0. If the CPU resources or the memory resources are completely used, but most of the other resources still remain, the remaining resources cannot be sold again, and are called "unsellable resources". The unsellable resources directly cause a waste of resources, this case is the most unsatisfactory case, and the fragmentPrio is assigned the value of the lowest priority (LOW_PRIO).

The effect of the fragmentation priority is fully using the resources of the host machine to reduce the resource fragmentation, to further improve the resource utilization and reduce the operational costs.

After the priorities of the dimensions of each candidate host machine are determined, a most suitable candidate host machine may be determined from the at least one candidate host machine according to the priorities of the dimensions and used as the target host machine.

A specific determining process may be:

According to a descending sequence of the priorities of the dimensions, the control device sorts host machines at a same dimension according to an ascending sequence of the priority values. Host machines with a same priority at the same dimension are sorted again according to a priority of a next dimension, to obtain candidate host machines sorted according to the descending sequence of the priorities;

The control device reduces one by one, starting from a candidate host machine sorted first according to the descending sequence of the sorted candidate host machines, resources required for creating the virtual machine, and uses, when reduction on a candidate host machine is successful, the candidate host machine on which the reduction is successful as the target host machine.

The sorting sequences of the dimensions may be preset. For example: a default dimension sorting standard and a descending sequence of priorities may be: a private network priority (vpcPrio), a concurrent task priority (taskPrio), a historical error priority (errorPrio), an anti-affinity priority (affinityPrio), an idle priority (freePrio), an image cache priority (imgPrio), and a fragmentation priority (fragmentPrio). The sorting standard may also be performing selection in a default standard scope, and the sequence may be adjusted and configured.

An example is used to describe a multi-dimensional sorting standard. For example, when sorting is performed on a host machine A and a host machine B, private network priorities (vpcPrios) are compared first, the host machine with the smaller vpcPrio is sorted front. If the vpcPrios of them are equal, concurrent task priorities (taskPrios) are compared. If they are still equal, historical error priorities (errorPrios) are compared, and the reset may be deduced by analogy.

The reducing one by one, starting from a candidate host machine sorted first, resources required by the to-be-created virtual machine, and using, when reduction on a candidate host machine is successful, the candidate host machine on which the reduction is successful as the target host machine may include:

determining, by the control device, according to resource data required by the to-be-created virtual machine, remaining resource data of the candidate host machine on which reduction is performed;

writing, by the control device, the remaining resource data of the candidate host machine into a database for maintaining remaining resource data of each host machine; and when the write is successful, using, by the control device, the candidate host machine on which write is successful as the target host machine.

In this embodiment of this application, after the sorting, a candidate host machine that is definitely sorted first is optimal, but the optimal candidate host machine may have another creation task, and it cannot be ensured that the creation is successful. Therefore, the final target host machine needs to be determined in a manner of reducing resource data.

Figure 6:
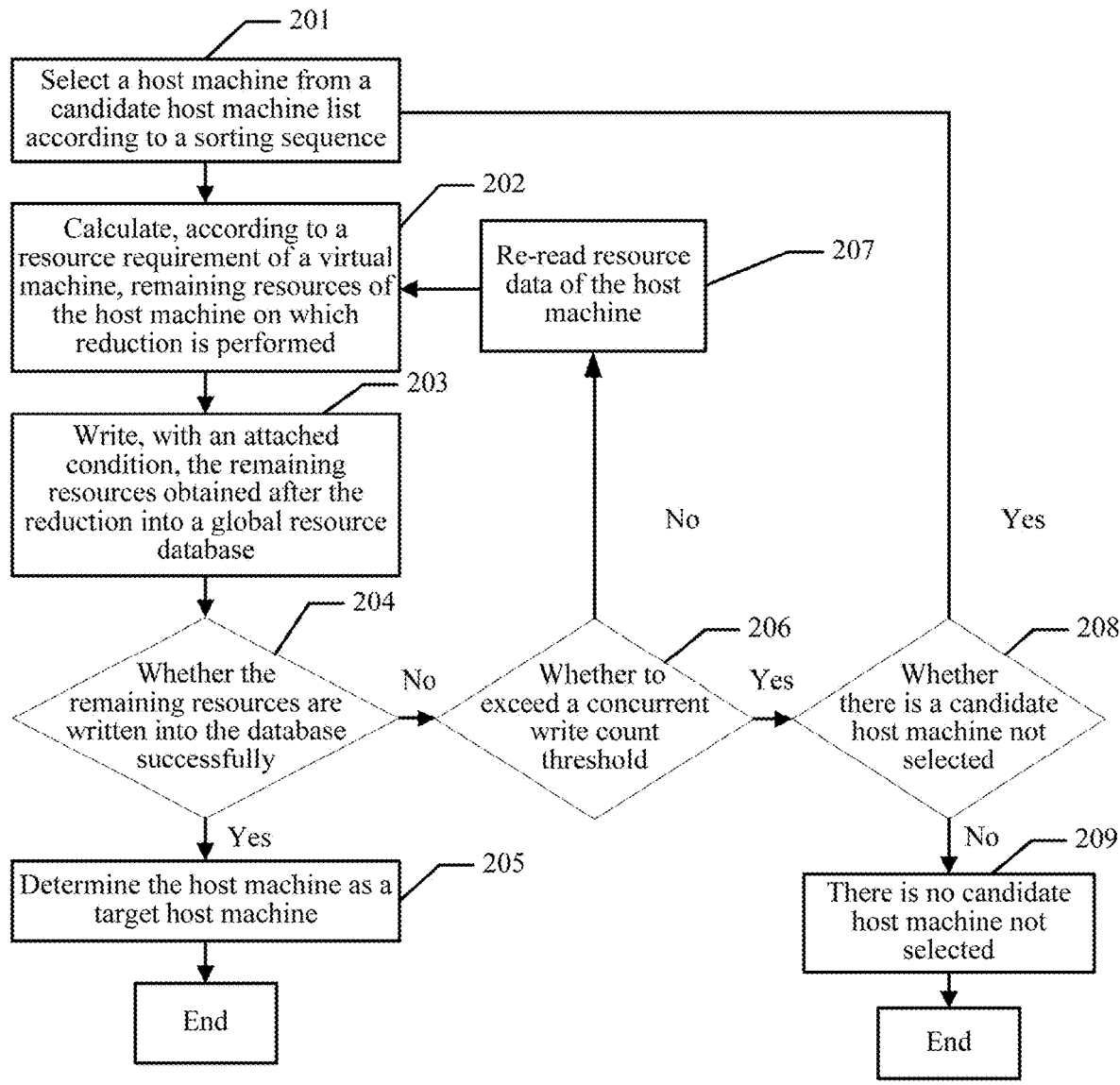
FIG. 6 illustrates a schematic diagram of a process of determining a target host machine according to an embodiment of this application.

For the reduction process, reference may be made to FIG. 6 for understanding.

FIG. 6 illustrates a flow diagram for logic of a control device. The logic may include various operations or steps. As shown in FIG. 6, the logic of determining a target host machine may be:

In step 201, select a host machine from a candidate host machine list according to a sorting sequence.

In step 202, calculate, according to a resource requirement of a virtual machine, remaining resources of the host machine on which reduction is performed.

In step 203, write, with an attached condition, the remaining resources obtained after the reduction into a global resource database.

The global resource database maintains attribute information of each host machine, and remaining amounts of various resources.

Writing with an attached condition is because another virtual machine creation request may also perform reduction for the host machine. Therefore, once the value of the remaining resources change during the reduction, the reduction fails, and the reduction is performed when the value no longer changes.

In step 204, determine whether the remaining resources are written into the database successfully; and if the write is successful, perform step 205, and if the write is not successful, perform step 206.

In step 205, when the write is successful, the current host machine is the target host machine, and the process ends.

When the write is successful, it indicates that the value of the remaining resources is modified successfully. For example: there are 120 remaining resource originally, 20 needs to be reduced for creating the virtual machine, and the remaining resources after the reduction are 100. If 100 is written successfully, it indicates that the write is successful.

In step 206 when the write fails, determine whether the value exceeds a concurrent write count threshold, if the value does not exceed the concurrent write count threshold, perform step 207, and if the value exceeds the concurrent write count threshold, perform step 208.

For the concurrent write count threshold, reference may be made to the foregoing description of the concurrent task priority part for understanding.

When the concurrent write count threshold is 3, if the value does not exceed the threshold, perform step 207, and if the value exceeds the threshold, perform step 208.

The failure of writing the remaining resources into the database is generally because the scheduler attempts to write the remaining resources into the database in multiple progresses concurrently. In this case, the write may be successful in only one progress, and the write fails in other progresses this time.

In step 207, if the value does not exceed the threshold, re-read resource data of the host machine, and go back to step 202.

In step 208, if the value exceeds the concurrent write count threshold, determine whether the candidate host machine list still has unused host machines; and if the candidate host machine list still has the unused host machines, go back to step 201; if the candidate host machine list does not have the unused host machines, the process ends at step 209.

In step 209, the candidate host machine list does not have the unused host machines, and the process ends.

The beneficial effect of the process of creating a virtual machine described above may include:

By means of attribute filtering in multiple aspects, it is ensured that in a heterogeneous environment, a selected host machine can meet a personalized requirement of a virtual machine. Intelligent sorting is performed according to a concurrent task priority and a historical error priority, to improve the success rate and the timeliness of producing the virtual machine; intelligent sorting is performed according to an anti-affinity priority, and virtual machines of a same user are placed on different host machines to perform distributed disaster recovery, to improve the availability and the stability of an entire application system of a user; intelligent sorting is performed according to a idle priority and a resource fragmentation priority, to fully use host machine resources, improve the resource utilization of a data center, and reduce the operational costs; intelligent sorting is performed according to an image cache priority, to avoid downloading an image as long as possible, shorten a time of creating the virtual machine, and improve the timeliness of the process. By using a concurrent scheduling mechanism, a scheduler selects a suitable host machine for the virtual machine in multiple progresses at the same time, to improve the throughput of a bin-packing algorithm and the scheduler.

Figure 7:
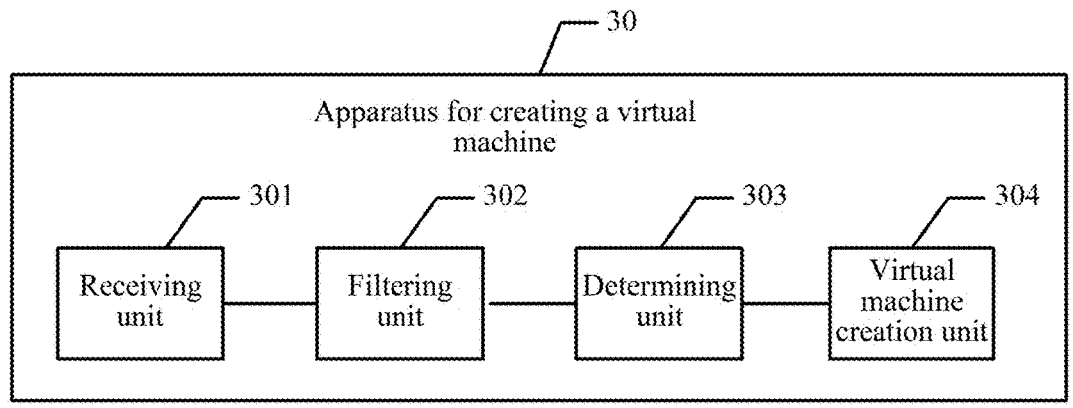
FIG. 7 illustrates a schematic diagram of an apparatus for creating a virtual machine according to an embodiment of this application.

Referring to FIG. 7, an embodiment of this application provides an apparatus 30 for creating a virtual machine. The apparatus 30 may be applied to a system having multiple host machines, for example, a cloud computing system. The apparatus 30 includes:

a receiving unit 301, configured to receive a virtual machine creation request;

a filtering unit 302, configured to select at least one candidate host machine from the multiple host machines according to the virtual machine creation request received by the receiving unit 301 and the attribute information of each host machine;

a determining unit 303, configured to determine a target host machine from the at least one candidate host machine according to a priority of each candidate host machine; and a virtual machine creation unit 304, configured to create the virtual machine on the target host machine.

The virtual machine creation request may include first requirement information and second requirement information of the to-be-created virtual machine, and the first requirement information is resource requirement information.

Compared with a method of only considering hardware resources that can be provided by the host machine, but not considering information of the host machine in other aspects, the apparatus for creating a virtual machine provided in this embodiment of this application not only considers hardware resources that can be provided for the to-be-created virtual machine by the host machine, but also considers requirement information of the to-be-created virtual machine in other aspects, to select the host machine for the to-be-created virtual machine from multiple aspects, thereby improving the success rate of creating the virtual machine.

Figure 8:
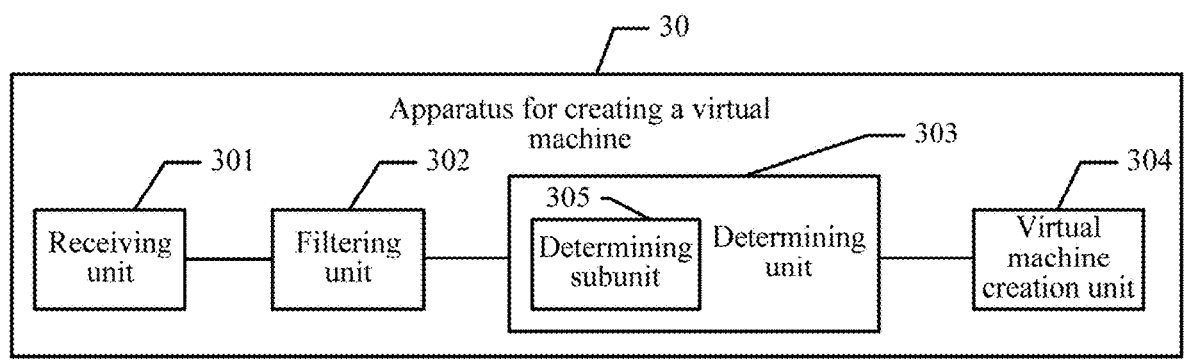
FIG. 8 illustrates a schematic diagram of an apparatus for creating a virtual machine according to another embodiment of this application.

Optionally, referring to FIG. 8, in another embodiment of the apparatus 30 for creating a virtual machine provided in this embodiment of this application, the determining unit 303 includes a determining subunit 305.

The determining subunit 305 is configured to determine the priority of each candidate host machine from multiple dimensions after the filtering unit 302 selects at least one candidate host machine.

The determining unit 303 is configured to determine the target host machine from the at least one candidate host machine according to the priority.

Optionally, the determining unit 303 is configured to:

sort, starting from a dimension sorted first according to a preset sequence of the multiple dimensions, candidate host machines in a descending sequence of priorities at the same dimension, and sort candidate host machines with a same priority at the same dimension according to a priority of a next dimension; and reduce one by one, starting from a candidate host machine sorted first, resources required for creating the virtual machine, and use, when reduction on a candidate host machine is successful, the candidate host machine on which the reduction is successful as the target host machine.

Optionally, the determining unit 303 is configured to:

determine, according to resource data required for creating the virtual machine, remaining resource data of the candidate host machine on which the reduction is performed;

write the remaining resource data of the candidate host machine into a database; and use a candidate host machine on which write is successful as the target host machine.

Optionally, the database is configured to maintain remaining resource data of each host machine.

Optionally, the multiple dimensions according to the preset sequence include:

at least one two of a private network, a concurrent task, a historical error, anti-affinity, idleness, image cache, and fragmentation.

Optionally, the filtering unit 302 is configured to:

construct a string filter according to the attribute information; and control the filter to filter the multiple host machines according to the first requirement information and the second requirement information, to obtain the at least one candidate host machine.

Optionally, the first requirement information includes processor information, memory information, and magnetic disk information required for creating the virtual machine; and the second requirement information includes at least one piece of requirement information, for creating the virtual machine, of a solid state drive, a cloud disk, a private network, a network adapter, a router, a network structure, a data center, a rack, a type of a host machine, a resource pool to which a host machine belongs, and a virtualization type.

In addition, when there are multiple virtual machine creation requests, the multiple apparatuses for creating a virtual machine concurrently execute the multiple virtual machine creation requests, and create a corresponding virtual machine for each virtual machine creation request.

Reference may be made to some of the descriptions of FIG. 1 to FIG. 6 for understanding of the foregoing apparatus for creating a virtual machine. Details are not described herein again.

Figure 9:
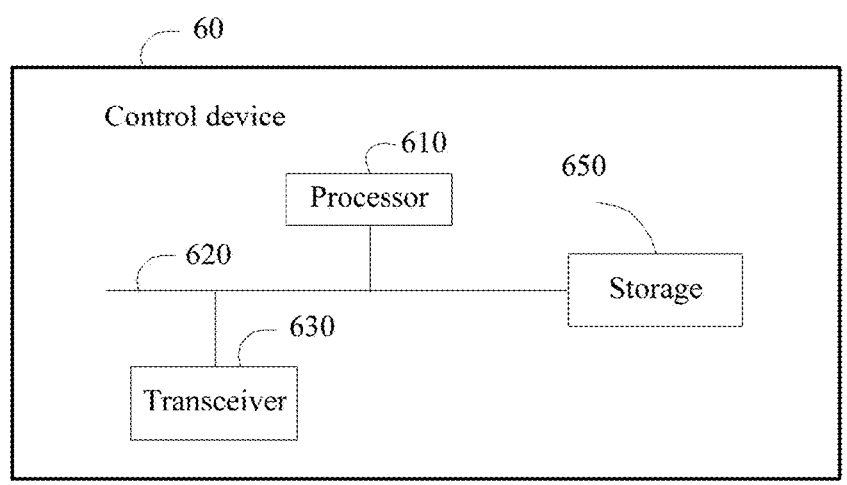
FIG. 9 illustrates a schematic diagram of a control device according to an embodiment of this application.

FIG. 9 illustrates a schematic structural diagram of a calculation apparatus 60 according to an embodiment of this application. An example of the calculation apparatus is a control device. The control device 60 includes a processor 610, a storage 650, and an input output apparatus (for example, a transceiver) 630. The storage 650 may include an only-read memory and a random access memory, and provide operation instructions and data to the processor 610. A part of the storage 650 may further include a non-volatile random access memory (NVRAM).

In some implementations, the storage 650 stores the following element, executable module, or data structure, or a subset thereof, or an extension set thereof.

In the embodiment of this application, by invoking the operating instruction (the operating instruction may be stored in an operating system) stored by the storage 650, receiving a virtual machine creation request;

selecting at least one candidate host machine from the multiple host machines according to the virtual machine creation request and attribute information of each host machine; and determining a target host machine from the at least one candidate host machine according to a priority of each candidate host machine; and creating the virtual machine on the target host machine.

The virtual machine creation request includes first requirement information and second requirement information of the to-be-created virtual machine, and the first requirement information is resource requirement information.

Compared with a method of only considering hardware resources that can be provided by the host machine, but not considering information the host machine in other aspects, the control device provided in this embodiment of this application not only considers hardware resources that can be provided for the to-be-created virtual machine by the host machine, but also considers requirement information of the to-be-created virtual machine in other aspects, to select the host machine for the to-be-created virtual machine from multiple aspects, thereby improving the success rate of creating the virtual machine.

The processor 610 controls operations of the control device 60. The processor 610 may also be referred to as a central processing unit (CPU). The storage 650 may include a read-only memory and a random access memory, and provides an instruction and data to the processor 610. A part of the storage 650 may further include an NVRAM. In a specific application, all components of the control device 60 are coupled by using a bus system 620, and besides a data bus, the bus system 620 may further include a power source bus, a control bus, a state signal bus, and the like. But, for ease of clear description, all types of buses in the diagram are marked as the bus system 620.

The method disclosed in the foregoing embodiments of this application may be applied to the processor 610, or in other words, may be implemented by the processor 610. The processor 610 may be an integrated circuit chip and has a signal processing capability. In an implementation process, steps in the foregoing methods may be implemented through a hardware integrated logical circuit in the processor 610, or an instruction configured on a hardware logical memory or circuit. The processor 610 may be a general-purpose processor, a DSP, an ASIC, an FPGA, another programmable logic component, a discrete gate or a transistor logic device, and a discrete hardware component, and may implement or execute methods, steps, and logical block diagrams disclosed in the embodiments of this application. The general-purpose processor may be a micro-processor, or the processor may also be any conventional processor or the like. The steps in the methods disclosed in the embodiments of this application may be directly implemented by a hardware decoding processor, or may be implemented by combining hardware modules in a decoding processor. The storage medium is located in the storage 650, and the processor 610 reads information in the storage 650 and performs the steps of the foregoing methods in combination with hardware of the processor.

Optionally, the processor 610 is further configured to:

determine the priority of each candidate host machine from multiple dimensions; and determine the target host machine from the at least one candidate host machine according to the priority.

Optionally, the processor 610 is configured to:

sort, starting from a dimension sorted first according to a preset sequence of the multiple dimensions, candidate host machines in a descending sequence of priorities at the same dimension, and sort candidate host machines with a same priority at the same dimension according to a priority of a next dimension; and reduce one by one, starting from a candidate host machine sorted first, resources required for creating the virtual machine, and use, when reduction on a candidate host machine is successful, the candidate host machine on which the reduction is successful as the target host machine.

Optionally, the processor 610 is configured to:

determine, according to resource data required for creating the virtual machine, remaining resource data of the candidate host machine on which the reduction is performed;

write the remaining resource data of the candidate host machine into a database; and use a candidate host machine on which write is successful as the target host machine.

Optionally, the processor 610 is configured to:

construct a string filter according to the attribute information; and control the filter to filter the multiple host machines according to the first requirement information and the second requirement information, to obtain the at least one candidate host machine.

Optionally, the first requirement information includes processor information, memory information, and magnetic disk information required for creating the virtual machine.

The second requirement information includes at least one piece of requirement information, for creating the virtual machine, of a solid state drive, a cloud disk, a private network, a network adapter, a router, a network structure, a data center, a rack, a type of a host machine, a resource pool to which a host machine belongs, and a virtualization type.

Optionally, the processor 610 is configured to: when there are multiple virtual machine creation requests, concurrently execute the multiple virtual machine creation requests, and create a corresponding virtual machine for each virtual machine creation request.

Reference may be made to some of the descriptions of FIG. 1 to FIG. 6 for understanding of the foregoing control device 60. Details are not described herein again.

The control device 60 may be implemented in many ways. The processor 610 may be one or more devices operable to execute logic. The logic may include computer executable instructions or computer code stored in the storage 650 or in other memory that when executed by the processor 610, cause the processor 610 to perform the features implemented by the logic of the receiving unit 301, the filtering unit 302, the determining unit 303, and/or the virtual machine creation unit 304. The computer code may include instructions executable with the processor 610.

The storage 650 may be any device for storing and retrieving data or any combination thereof. The storage 650 may include non-volatile and/or volatile memory, such as a random access memory (RAM), a read-only memory (ROM), an erasable programmable read-only memory (EPROM), or flash memory. Alternatively or in addition, the storage 650 may include an optical, magnetic (hard-drive) or any other form of data storage device.

The storage 650 may include at least one the receiving unit 301, the filtering unit 302, the determining unit 303, and/or the virtual machine creation unit 304 and/or other components and subcomponents of the apparatus 30 described herein. In addition, the memory may include any other component previously discussed, such as the determining subunit 305 and/or other components of the apparatus 30 described herein.

The control device 60 may be implemented in many different ways. For example, each component of the control device 60 may include a circuit or circuitry. Each circuit or circuitry may be hardware or a combination of hardware and software. The circuitry may include the receiving unit 301, the filtering unit 302, the determining unit 303, and/or the virtual machine creation unit 304, and/or other components and subcomponents of the apparatus 30 described herein. For example, each circuit or circuitry may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each circuitry may include memory hardware, such as a portion of the storage 650, for example, that comprises instructions executable with the processor 610 or other processor to implement one or more of the features of the circuitry. When any one of the circuitry includes the portion of the memory that comprises instructions executable with the processor 610, the circuitry may or may not include the processor 610. In some examples, each circuitry may just be the portion of the storage 650 or other physical memory that comprises instructions executable with the processor 610 or other processor to implement the features of the corresponding circuitry without the circuitry including any other hardware. Because each circuitry includes at least some hardware even when the included hardware comprises software, each circuitry may be interchangeably referred to as a hardware circuitry.

Some features are shown stored in a computer readable storage medium (for example, as logic implemented as computer executable instructions or as data structures in memory). All or part of the control device 60 and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the control device 60 may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL)).

All of the discussion, regardless of the particular implementation described, is illustrative in nature, rather than limiting. For example, although selected aspects, features, or components of the implementations are depicted as being stored in memory(s), all or part of the control device 60 or devices may be stored on, distributed across, or read from other computer readable storage media, for example, secondary storage devices such as hard disks, flash memory drives, floppy disks, and CD-ROMs. Moreover, the various modules, circuitry and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer, central processing unit ("CPU"), graphics processing unit ("GPU"), or system.

Furthermore, although specific components are described above, methods, systems, apparatus, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same apparatus executing a same program or different programs. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

What is claimed is:

1. A virtual machine creation method, comprising:
   receiving a virtual machine creation request, the virtual machine creation request including first requirement information for creation of a virtual machine and second requirement information for creation of the virtual machine;
   selecting a plurality of candidate host machines from a plurality of host machines based on the virtual machine creation request and attribute information corresponding to the candidate host machines by:
      constructing a string filter corresponding to the attribute information;
      filtering, using the string filter, the host machines based on the first requirement information and the second requirement information; and
      obtaining the candidate host machines in response to filtering the plurality of host machines;
   determining a target host machine from the candidate host machines based on a priority of each candidate host machine; and
   creating the virtual machine on the target host machine.

2. The virtual machine creation method of claim 1, wherein determining the target host machine from the candidate host machines based on the priority of each candidate host machine comprises:
   determining a plurality of priorities for each respective candidate host machine across multiple dimensions; and
   determining the target host machine from the candidate host machines based on a highest ranked priority in at least one of the multiple dimensions.

3. The virtual machine creation method of claim 2, wherein determining the target host machine from the candidate host machines based on the highest ranked priority in at least one of the multiple dimensions further comprises:
   selecting a first dimension according to a preset sequence associated with the multiple dimensions;
   sorting, starting from the first dimension, the candidate host machines in a first descending sequence based on priorities associated with the first dimension;
   sorting the candidate host machines with a same priority associated with the first dimension in a second descending sequence based on a plurality of priorities associated with a next dimension;
   sequentially reducing, in a database, starting with a candidate host machine with the highest ranked priority associated with at least one of the dimensions, resources used for creating the virtual machine; and
   selecting, the target host machine from the sorted candidate host machines in response to a completed reduction corresponding to the candidate host machine.

4. The virtual machine creation method of claim 2, wherein determining the target host machine from the candidate host machines based on the highest ranked priority in at least one of the multiple dimensions further comprises:
   selecting a first dimension according to a preset sequence associated with the multiple dimensions;
   sorting, starting from the first dimension, the candidate host machines in a descending sequence of priorities associated with the first dimension;
   sequentially reducing, in a database, starting with a candidate host machine with the highest ranked priority in the at least one of the dimensions, resources used for creating the virtual machine by:
      determining, based on the resources used for creating the virtual machine, remaining resource data of at least one of the sorted candidate host machines,
      writing the remaining resource data of the at least one of the sorted candidate host machines into a database; and
   selecting the target host machine from the sorted candidate host machines in response to a completed writing of the remaining resource data corresponding to the candidate host machine.

5. The virtual machine creation method of claim 2, wherein the multiple dimensions comprise at least one of a private network, a concurrent task, a historical error, anti-affinity, idleness, image cache, or fragmentation.

6. The virtual machine creation method of claim 1, wherein
   the first requirement information comprises processor information, memory information, and magnetic disk information used for creating the virtual machine and the second requirement information comprises at least one of a solid state drive requirement, a cloud disk requirement, a private network requirement, a network adapter requirement, a router requirement, a network structure requirement, a data center requirement, a rack requirement, a type of a host machine requirement, a resource pool requirement, or a virtualization type requirement.

7. The virtual machine creation method of claim 1, wherein receiving the virtual machine creation request comprises receiving multiple virtual machine creation requests, the virtual machine creation method further comprising:
   executing the multiple virtual machine creation requests concurrently; and
   creating a corresponding virtual machine for each virtual machine creation request.

8. A control device, comprising:
   a processor the processor configured to:
   receive a virtual machine creation request including first requirement information and second requirement information for creating a virtual machine;
   select a plurality of candidate host machines from a plurality of host machines based on the virtual machine creation request and attribute information corresponding to the candidate host machines by:
      constructing a string filter corresponding to the attribute information; and
      filtering, using on the string filter, the host machines based on the first requirement information and the second requirement information; and
      obtaining the candidate host machines in response to filtering the plurality of host machines;
   determine a target host machine from the candidate host machines based on a priority of each candidate host machine; and
   create the virtual machine on the target host machine.

9. The control device of claim 8, wherein to determine the target host machine from the candidate host machines based on the priority of each candidate host machine, the processor is configured to:
   determine a plurality of priorities for each respective candidate host machine across multiple dimensions; and
   determine the target host machine from the candidate host machines based on a highest ranked priority in at least one of the multiple dimensions.

10. The control device of claim 9, wherein to determine the target host machine from the candidate host machines based on the highest ranking priority in at least one of the multiple dimensions, the processor is configured to:
   select a first dimension according to a preset sequence associated with the multiple dimensions;
   sort, starting from the first dimension, the candidate host machines in a first descending sequence based on priorities associated with the first dimension;
   sort the candidate host machines with a same priority associated with the first dimension in a second descending sequence based on a plurality of priorities associated with a next dimension;
   sequentially reduce, in a database, starting with the candidate host machine with the highest ranked priority in the at least one of the dimensions, resources used for creating the virtual machine; and
   select, the target host machine from the sorted candidate host machines in response to a completed reduction corresponding to the candidate host machine.

11. The control device of claim 9, wherein to determine the target host machine from the candidate host machines based on the highest ranked priority in at least one of the multiple dimensions, the processor is further configured to:
   select a first dimension according to a preset sequence associated with the multiple dimensions;

sort, starting from the first dimension, the candidate host machines in a descending sequence of priorities associated with the first dimension;

sequentially reduce, in a database, starting with the candidate host machine with the highest ranked priority in the at least one of the dimensions, resources used for creating the virtual machine by:

determine, based on the resources used for creating the virtual machine, remaining resource data of at least one of the sorted candidate host machines, and write the remaining resource data of the at least one of the sorted candidate host machines into a database; and select the target host machine from the sorted candidate host machines in response to a completed writing of the remaining resource data corresponding to the candidate host machine.

12. The control device of claim 9, wherein the multiple dimensions comprise at least one of a private network, a concurrent task, a historical error, anti-affinity, idleness, image cache, or fragmentation.

13. The control device of claim 8, wherein the first requirement information comprises processor information, memory information, and magnetic disk information used for creating the virtual machine; and the second requirement information comprises at least one of a solid state drive requirement, a cloud disk requirement, a private network requirement, a network adapter requirement, a router requirement, a network structure requirement, a data center requirement, a rack requirement, a type of a host machine requirement, a resource pool requirement, or a virtualization type requirement.

14. The control device of claim 8, wherein receiving the virtual machine creation request comprises receiving multiple virtual machine creation requests, wherein the processor is further configured to:

execute the multiple virtual machine creation requests concurrently; and create a corresponding virtual machine for each virtual machine creation request.

15. A non-transitory computer-readable storage medium storing program instructions executable by at least one processor to:

receive a virtual machine creation request including first requirement information and second requirement information for creating a virtual machine;

select a plurality of candidate host machines from a plurality of host machines based on the virtual machine creation request and attribute information corresponding to the candidate host machines by:

constructing a string filter corresponding to the attribute information; and filtering, using on the string filter, the host machines based on the first requirement information and the second requirement information; and obtaining the candidate host machines in response to filtering the plurality of host machines;

determine a target host machine from the candidate host machines based on a priority of each candidate host machine; and create the virtual machine on the target host machine.

16. The non-transitory computer-readable storage medium of claim 15, wherein to determine the target host machine from the candidate host machines based on the priority of each candidate host machine, the at least one processor is further configured to:

determine a plurality of priorities for each respective candidate host machine across multiple dimensions; and determine the target host machine from the candidate host machines based on a highest ranked priority in at least one of the multiple dimensions.

17. The non-transitory computer-readable storage medium of claim 16, wherein the multiple dimensions comprise at least one of a private network, a concurrent task, a historical error, anti-affinity, idleness, image cache, or fragmentation.

18. The non-transitory computer-readable storage medium of claim 16, wherein the at least one processor is further configured to determine the target host machine from the candidate host machines based on the highest ranked priority in at least one of the multiple dimensions by:

selecting a first dimension according to a preset sequence associated with the multiple dimensions;

sorting, starting from the first dimension, the candidate host machines in a first descending sequence based on priorities associated with the first dimension;

sorting the candidate host machines with a same priority associated with the first dimension in a second descending sequence based on a plurality of priorities associated with a next dimension;

sequentially reducing, in a database, starting with a candidate host machine with the highest ranked priority associated with at least one of the dimensions, resources used for creating the virtual machine; and selecting, the target host machine from the sorted candidate host machines in response to a completed reduction corresponding to the candidate host machine.

19. The non-transitory computer-readable storage medium of claim 16, wherein the at least one processor is further configured to determine the target host machine from the candidate host machines based on the highest ranked priority in at least one of the multiple dimensions by:

selecting a dimension according to a preset sequence associated with the multiple dimensions;

sorting, starting from the dimension, the candidate host machines in a descending sequence of priorities associated with the dimension;

sequentially reducing, in a database, starting with a candidate host machine with the highest ranked priority in the at least one of the dimensions, resources used for creating the virtual machine by:

determining, based on the resources used for creating the virtual machine, remaining resource data of at least one of the sorted candidate host machines, writing the remaining resource data of the at least one of the sorted candidate host machines into a database; and selecting the target host machine from the sorted candidate host machines in response to a completed writing of the remaining resource data corresponding to the candidate host machine.

20. The non-transitory computer-readable storage medium of claim 15, wherein:

the first requirement information comprises processor information, memory information, and magnetic disk information used for creating the virtual machine; and the second requirement information comprises at least one of a solid state drive requirement, a cloud disk requirement, a private network requirement, a network adapter requirement, a router requirement, a network structure requirement, a data center requirement, a rack requirement, a type of a host machine requirement, a resource pool requirement, or a virtualization type requirement.

* * * * *